Nov. 13, 1923.   1,473,735
C. F. ROHWER
FACING FOR CLUTCH JAWS
Filed March 8, 1921

C. F. Rohwer, Inventor

Patented Nov. 13, 1923.

1,473,735

UNITED STATES PATENT OFFICE.

CARL F. ROHWER, OF HOT SPRINGS, ARKANSAS.

FACING FOR CLUTCH JAWS.

Application filed March 8, 1921. Serial No. 450,598.

*To all whom it may concern:*

Be it known that I, CARL F. ROHWER, a citizen of the United States, residing at Hot Springs, in the county of Garland and State of Arkansas, have invented a new and useful Facing for Clutch Jaws, of which the following is a specification.

This invention aims to provide a clutch having a removable jaw facing, the construction being such that the facing may be made of harder material than the body portion of the clutch member, it being possible to renew the facing when the facing is worn.

The invention aims, further, to provide novel means for securing the facing to the clutch.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
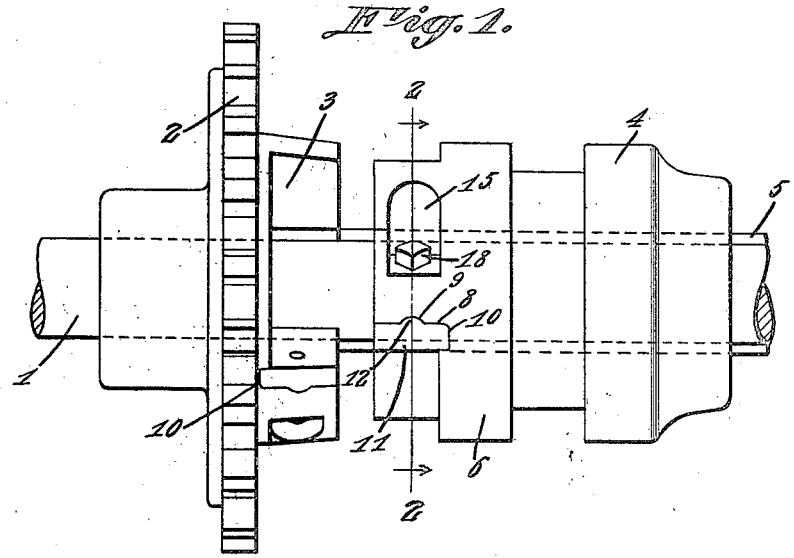
Figure 2:
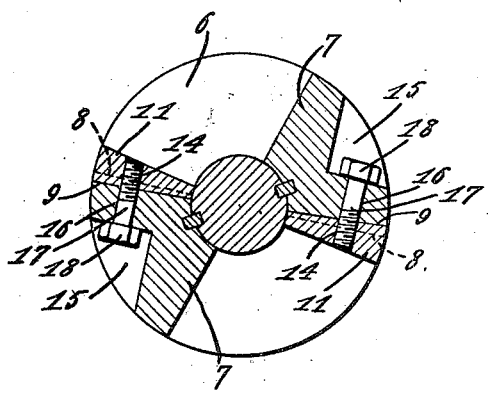
Figure 3:
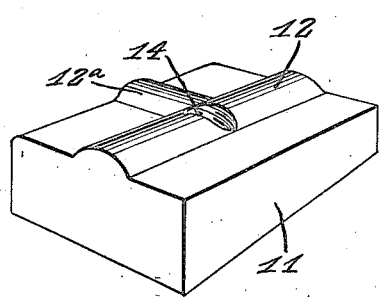
Figure 4:
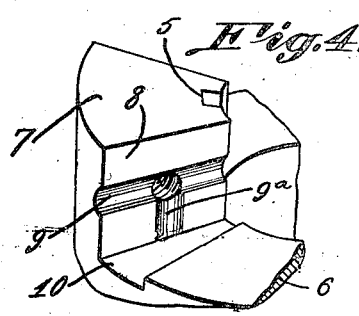

Figure 1 shows in plan, a device constructed in accordance with the invention; Figure 2 is a cross section on the line 2—2 of Figure 1; Figure 3 is a perspective view showing the facing; Figure 4 is a perspective view showing a portion of the clutch member.

The device forming the subject matter of this application may be embodied in widely different constructions. However, to illustrate one application of the invention, there is shown in Figure 1 a shaft 1, whereon a driving or driven element 2, such as a gear wheel or sprocket wheel, is rotatable. The element 2 has a clutch member 3.

A clutch member 4 is splined at 5 to the shaft 1 for sliding movement therealong, into and out of engagement with the element 2. The clutch member includes a body 6 having projecting jaws 7, adapted to cooperate with like jaws on the clutch member 3—all as common and well understood in the art. Each jaw 7 has a transverse surface 8 provided with grooves 9 and $9^a$, disposed at right-angles to each other. A seat 10 is formed in the body 6 of the clutch member 4 at one end of the surface 8.

The numeral 11 denotes a facing, preferably made of metal which is harder than the metal out of which the clutch member 4 is constructed. The facing 11 is adapted to be mounted on the transverse surface 8 of the jaw 7, and has ribs 12 and $12^a$, the rib 12 being received in the groove 9, and the rib $12^a$ being received in the groove $9^a$, the parts 9 and 12, and $9^a$ and $12^a$ cooperating in retaining the facing in place.

The facing 11 and its rib 12 have an opening 14. A recess 15 is fashioned in the periphery of the jaw 7. An opening 16 is formed in the jaw 7 and communicates with the recess 15, the opening 16 being in axial alinement with the opening 14 in the facing 11. One edge of the facing 11 is received in the seat 10 of the body 6, the construction being such that the facing is retained securely in place. A securing element 17 such as a screw, is mounted in the openings 16 and 14, and is threaded in the opening 14 of the facing 11. The head 18 of the securing element 17 is housed in the recess 15.

The clutch member 3 preferably is equipped with a facing constructed like the facing 11 and mounted in the same way as the facing 11.

It will be obvious that the facing 11 may be renewed or replaced upon occasion, the life of the clutch being lengthened, and much chipping, chiseling and scraping being avoided, when the clutch members are worn, and when adjustment is required. Owing to the way in which the ribs 12 and $12^a$ cooperate with the grooves 9 and $9^a$, practically all of the strain will be taken off the securing element 17.

Having thus described the invention, what is claimed is:—

1. In a device of the class described, a clutch member having an outstanding jaw, a facing mounted upon the side of the jaw, and a securing element forming a detachable connection between the facing and the jaw, the facing and the jaw constituting cooperating parts, one of which is provided with ribs disposed substantially at right angles to each other, the other of said cooperating parts having grooves receiving the ribs, the ribs and the grooves coacting to hold the facing against movement in the direction of the length of either of the ribs, thereby to relieve the strain on the securing element.

2. A device of the class described, constructed as set forth in claim 1, and further characterized by the fact that the facing has an opening for the securing element, said opening being located at the point of juncture of the ribs, thereby to strengthen the facing for the reception of the securing element.

3. A device of the class described, constructed as set forth in claim 1 and further characterized by the fact that the clutch member has a radial recess located at the inner end of the jaw, one edge of the facing being disposed in the recess.

4. A device of the class described, constructed as set forth in claim 1, and further characterized by the fact that the facing has an opening for the securing element, said opening being located at the point of juncture between the ribs, thereby to strengthen the facing for the reception of the securing element, the clutch member having a radial recess located at the inner end of the jaw, one edge of the facing being disposed in the recess.

5. In a device of the class described, a clutch member having an outstanding jaw and provided with a recess disposed at the inner end of the jaw and disposed radially of the clutch member, a facing mounted on the side of the jaw and having one of its edges mounted in the recess, and a securing element forming a releasable connection between the facing and the jaw, the facing and the jaw being provided with interengaged rib and groove elements, the engagement of said edge of the facing in the recess serving to aid in holding the tongue and groove elements interengaged, and said elements operating to relieve the strain on the securing element.

In testimony that I claim the foregoing as my own, I have hereto affixed my signature in the presence of two witnesses.

CARL F. ROHWER.

Witnesses:
V. H. HALLMAN,
FERD J. MAZZIA.